United States Patent [19]

Le Bris

[11] Patent Number: 5,595,669

[45] Date of Patent: Jan. 21, 1997

[54] METHOD OF FORMING COUPLING DIOPTERS AT THE ENDS OF OPTICAL FIBERS

[75] Inventor: Jean Le Bris, Quincy Sous Senart, France

[73] Assignee: Alcatel N.V., Amsterdam, Netherlands

[21] Appl. No.: 288,745

[22] Filed: Aug. 16, 1994

[30] Foreign Application Priority Data

Aug. 18, 1993 [FR] France .................................. 93 10077

[51] Int. Cl.$^6$ ............................ B23K 10/00; C03B 37/01
[52] U.S. Cl. ................ 219/121.59; 219/121.38; 219/121.58; 219/121.48; 65/391; 65/436; 65/509
[58] Field of Search .................... 219/121.37, 121.38, 219/121.59, 121.48, 121.45, 121.58; 65/391, 429, 436, 483, 509; 358/901.1

[56] References Cited

U.S. PATENT DOCUMENTS

| | | |
|---|---|---|
| 3,684,474 | 8/1972 | Chisholm et al. . |
| 4,049,414 | 9/1977 | Smith ........................................ 219/57 |
| 4,118,618 | 10/1978 | Gauthier et al. ..................... 219/121 P |
| 4,345,137 | 8/1982 | Mignien et al. ................... 219/121 PK |

FOREIGN PATENT DOCUMENTS

2538916A1  7/1983  France .

OTHER PUBLICATIONS

Ch. W. Barnard et al, "Single–Mode Fiber Microlens with Controllable Spot Size", *Applied Optics*, vol. 30, No. 15, 20 May 1991, pp. 1958–1962.

JP–A–03 050 510, *Patent Abstracts Of Japan*, vol. 15, No. 198 (P–1204) 22 May 1991.

JP–A–58 057 102, *Patent Abstracts Of Japan*, vol. 7, No. 146 (P–206) (1291) 25 Jun. 1983.

*Primary Examiner*—Mark H. Paschall
*Attorney, Agent, or Firm*—Sughrue, Mion, Zinn, Macpeak & Seas

[57] ABSTRACT

To enable surface tension forces to confer upon an optical fiber end (P1), a shape procuring good optical coupling the end is partially melted in an electric arc (ZC). To improve the reproducibility of this shape movement into the arc is achieved by a unidirectional sideways displacement (MC) of the fiber at an angle to the optical fiber axis. The invention applies to coupling a flat array of optical fibers to a strip of components such as semiconductor lasers. To this end the fibers (F1, ... , F6) are fixed into grooves on a fiber support (2). The latter is displaced to dip the fiber ends simultaneously into a chemical etching bath which gives them a pointed shape and then to move them successively into the electric arc.

9 Claims, 3 Drawing Sheets

METHOD OF FORMING COUPLING DIOPTERS AT THE ENDS OF OPTICAL FIBERS

FIELD OF THE INVENTION

The present invention concerns the formation of dioptric surfaces at the ends of glass, especially silica glass optical fibers to facilitate optical coupling of the fibers to other optical components.

DESCRIPTION OF THE PRIOR ART

A prior art conforming method includes the following basic operations:

Fiber fixing. A rectilinear section of an optical fiber is fixed to a mobile fiber support so that the section extends to one end of the fiber located at a distance from the fiber support.

Chemical pre-conformation. The end of the fiber is given an intermediate shape by immersion of this end in an etching bath.

Heating preparation. Heating means rated to melt the glass of the fiber are prepared for use.

Finally, heating displacement. The fiber support is moved to insert the end of the fiber into the area of action of the heating means and to remove it therefrom. The time for which the fiber end remains in this area is such that it is partially melted. To be more precise, it is such that surface tension and/or gravity forces modify the shape of the fiber end so that it changes from the intermediate shape previously formed to a required final shape enabling good optical coupling.

This prior art method is shown in part in FIG. 2, which shows a vertical optical fiber section F' whose lower end P' is to be conformed. The heating area ZC is occupied by a plasma created by an electric arc struck between two electrodes E1 and E2.

In this prior art method the heating displacement MC' is a downward and then upward vertical displacement to immerse the end P' to be conformed temporarily in the heating area ZC.

This prior art method has the drawback that its results are not perfectly reproducible, despite measures to render them reproducible. These measures are as follows:

the electric arc is carefully stabilized, the downward and upward speeds and the position of the lowest point reached by the fiber end to be conformed are carefully preserved between fiber end conformation treatments applied to successive optical fibers, the fibers are chosen to be identical at the outset and are subject to the same chemical preconformation treatment.

Despite these measures the shapes imparted to the ends of two fibers are not as similar as is desirable. This want of reproducibility means that in many cases it is not possible to approximate sufficiently an optimal shape, which is achieved only under exceptional conditions.

An object of the present invention is a simple way to confer upon the end of an optical fiber a shape that is more reproducible than hitherto.

SUMMARY OF THE INVENTION

To this end the invention consists in a method of forming coupling diopters at the ends of optical fibers in which displacement of a fiber end to be conformed causes said end to enter a heating area in order to cause it to melt partially, the method being characterized in that this displacement is a unidirectional sideways displacement.

DESCRIPTION OF THE PREFERRED EMBODIMENT

Figure 3:
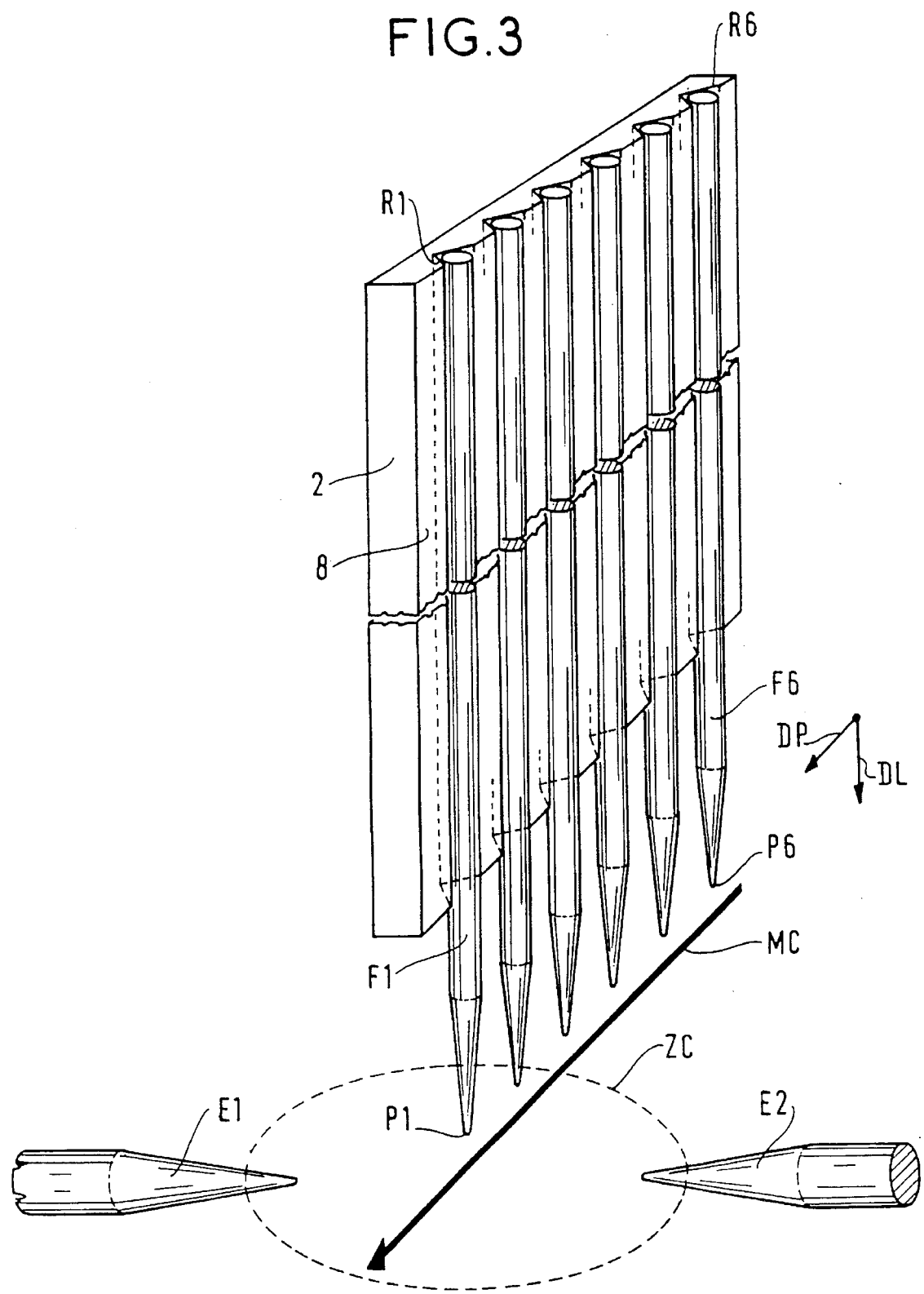
FIG. 3 shows a heating displacement operation of the process of the invention.
Figure 4:
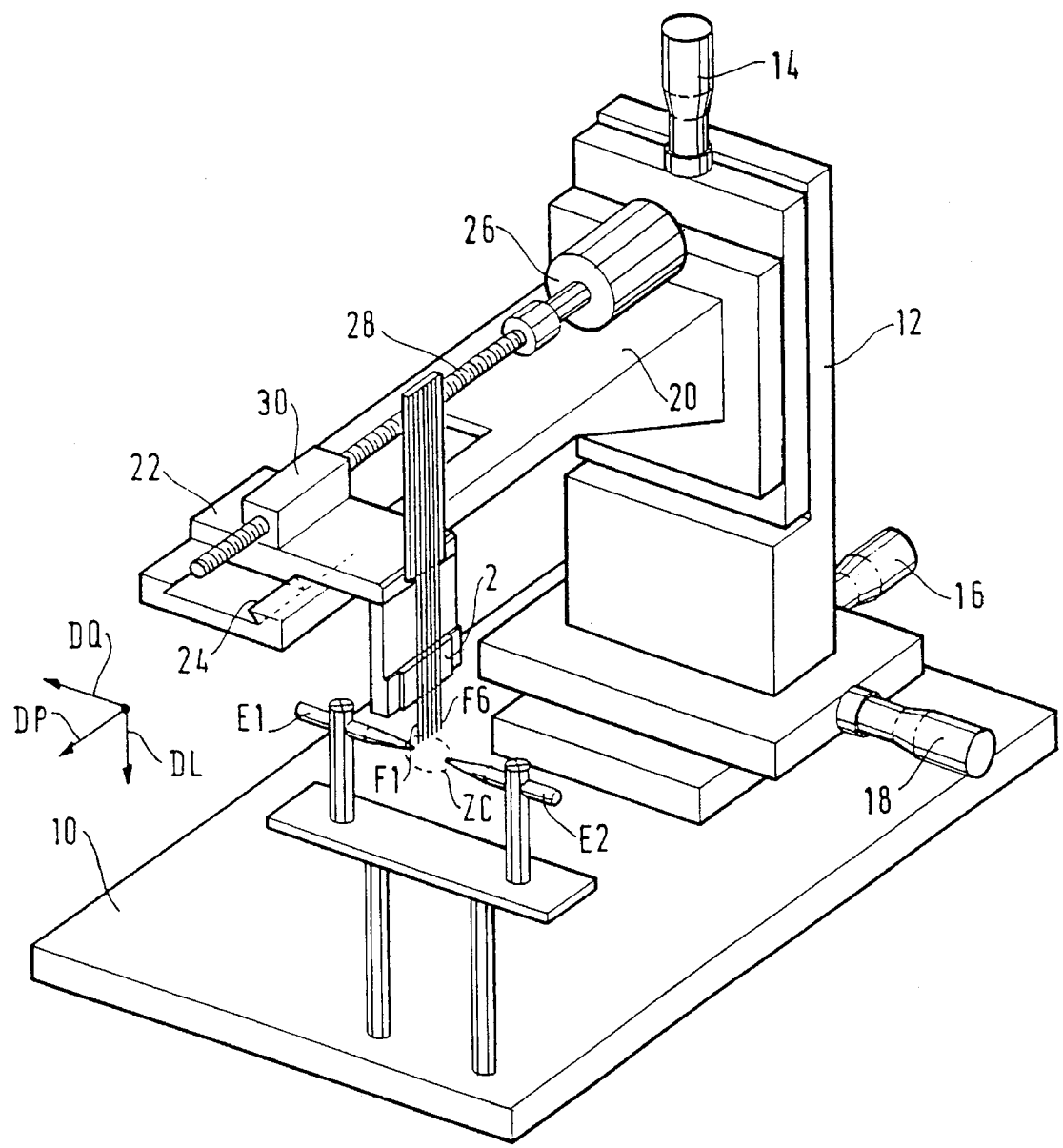
FIG. 4 shows apparatus used to carry out the operation of FIG. 3.

Referring to FIGS. 3 and 4, the method of the present invention comprises the following operations known from the prior art:

Fiber fixing. A rectilinear section of an optical fiber F1 is fixed to a mobile fiber support 2 so that this section extends in a straight line from the fiber support to an end P1 of the fiber to be conformed located at a distance from the fiber support. The fiber is made from glass, typically from silica glass. The method is implemented in such a way that this fiber end remains fastened to the fiber support. The direction of the section constitutes a longitudinal direction DL, that is in the direction of the axes of the optical fibers F1–F6.

Heating preparation. Heating means are used which can melt said glass if it remains in a localized heating area ZC defined by the heating means. The heating means is typically a stabilized electric arc forming a plasma between two electrodes E1 and E2.

Finally, heating displacement. This operation consists in displacing the fiber support 2 in translation so that the fiber end P1 to be conformed enters the heating area ZC and removing it therefrom after the fiber end has remained in this area for a given period. The duration of this period is limited and such that the fiber end melts partially so that surface tension and or gravity forces confer the required shape on it.

In accordance with the present invention the heating displacement MC is a unidirectional displacement of the fiber support 2 in a sideways passage direction DP at an angle to the longitudinal direction DL or optical fiber axes and the speed of this displacement is stabilized over a regular displacement period starting before and ending after said period for which the fiber end remains in the heating area.

The following additional and preferred features are used in the method described by way of example:

The heating displacement MC is rectilinear.

The passage direction DP is a transverse direction perpendicular to the longitudinal direction DL.

The longitudinal direction DL is vertical and the fiber end P1 to be conformed is below the fiber support.

The fiber fixing operation includes the fixing of a plurality of optical fiber sections F1, . . . , F6. These sections are identical and when fixed form a succession of fiber sections in a succession direction DP defined by the fiber support. In this example the passage direction DP is parallel to this succession direction.

In this example the fiber support 2 is preferably made of monocrystalline silicon and includes a plurality of identical V-grooves R1, . . . , R6 extending in the longitudinal direction DL. The grooves are regularly spaced in the succession direction DP on one side 8 of the fiber support. This side and the flanks of the grooves are formed in preferred crystallographic planes of the fiber support. Said plurality of fiber sections F1, . . . , F6 is fixed into this plurality of grooves, one per groove, by means of an adhesive, for example. In this case the heating displacement MC is rectilinear.

As is well known, a plurality of fibers forming a flat array in this way and fixed to a fiber support of this kind facilitates coupling of the fibers to a strip of optical components such as semiconductor layers. To this end it is sufficient for the fibers to be spaced at the same gap as the components.

Figure 1:
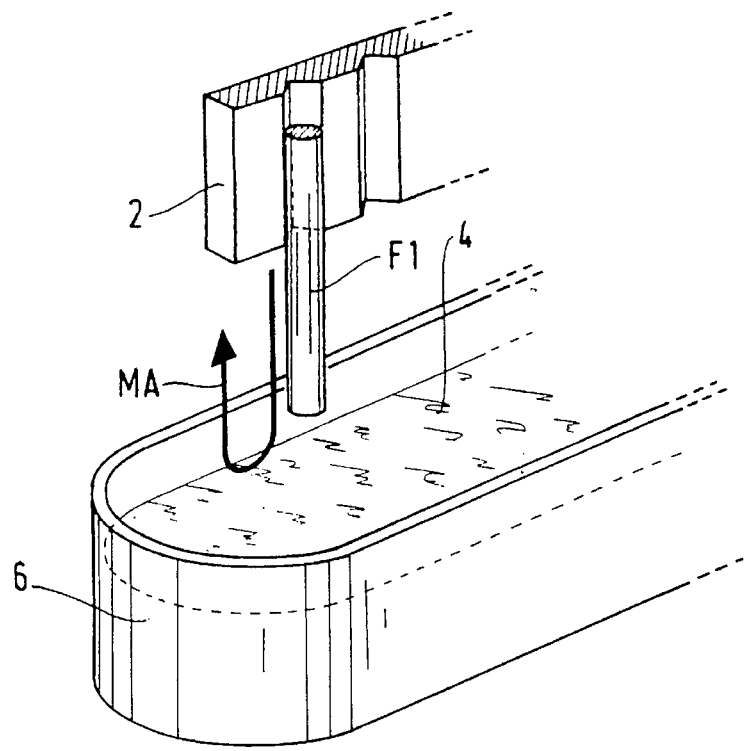
FIG. 1 shows a chemical pre-conformation operation which is part of the prior art process previously mentioned as well as of the process of the invention.
Figure 2:
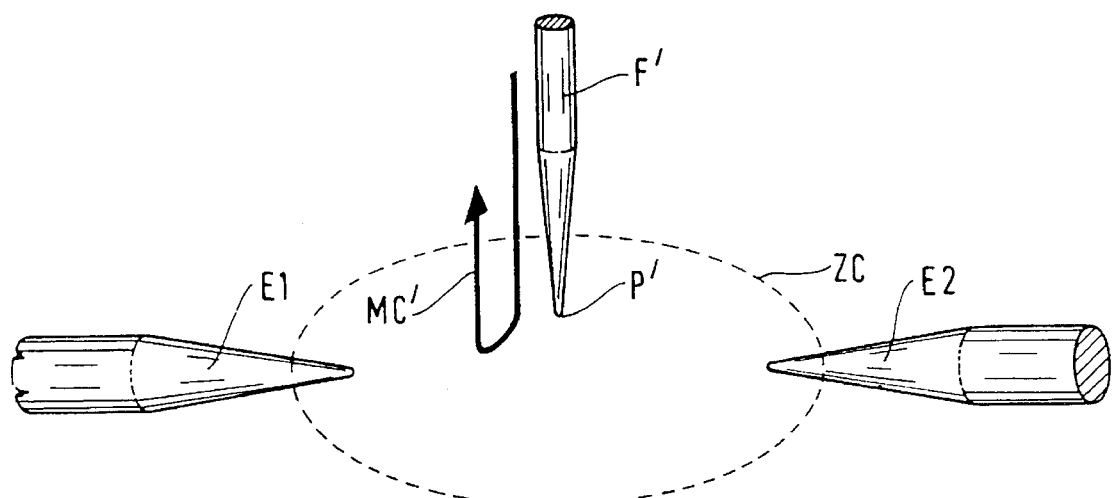
FIG. 2 has already been described and shows a heating displacement operation which is part of the prior art process.

In a manner analogous to what is already known for a single fiber, after the fiber fixing operation and before the heating displacement operation a chemical preconformation operation is preferably carried out, of the kind previously mentioned, to conform one end only of the fiber by means of a known method. This pre-conformation method is a composite operation and includes the following operations, which are shown in FIG. 1:

Preparation of a liquid etching bath 4 in an open-top etching container 6.

Positioning of the fiber support 2 over the etching container. The longitudinal direction DL of the fibers is then vertical, the fiber ends P1, . . . P6 to be conformed are below the fiber support and the succession direction DP is horizontal.

Finally, dipping of the fibers by vertical displacement MA of the fiber support 2. The fiber support is lowered and then raised to immerse the fiber ends P1, etc to be conformed temporarily in the bath so that they have a pointed intermediate shape after this dipping operation. This intermediate shape is such that, after the heating displacement operation, the fibers will assume an optical lens shape which is the required shape.

After this latter operation the fiber support 2 and the fibers can be offered up to a strip of semiconductor optical components such as lasers or diodes, for example, for simultaneous coupling of the fibers to respective components.

The highly reproducible conformation that the present invention can easily achieve has the advantage of a significant improvement in the quality of such coupling.

Referring to FIG. 4, apparatus for implementing the method described above includes the following components on a common table 10:

Electrodes E1 and E2 provided with electrical power supply and feed means (not shown) to produce a stable electrical arc.

A three-dimensional adjustment unit 12 with knobs 14, 16 and 18 for adjusting the position of a plate 20 in the longitudinal direction DL or in the direction of the optical fiber axes, preferably at right angles to the optical fiber axes, the passage direction DP and a third direction DQ perpendicular to the first two.

A carriage 22 guided along the passage direction DP by a guide Vee 24 formed on the plate 20.

A motor 26 driving the carriage through a lead screw 28 and nut 30.

The fiber support 2 carrying the flat array of fibers F1 through F6.

The travel of the carriage 22 is significantly greater than the width of the flat array of fibers plus the width of the plasma formed between the electrodes E1 and E2. Furthermore, means (not shown) are provided to stabilize the speed of the motor 26 so that the speed at which the flat array is moved in the plasma is accurately defined.

I claim:

1. Method of forming coupling diopters at the ends of optical fibers in which displacement of a fiber end (P1) to be conformed causes said end to enter a heating area (ZC) so that it is partially melted, this method being characterized in that this displacement is a unidirectional sideways displacement (MC) at an angle to the axes of the optical fibers.

2. Method according to claim 1 comprising the following operations:

fixing a rectilinear section of an optical fiber (F1) to a mobile fiber support (2) so that said section extends in a straight line from said fiber support to an end (P1) of said fiber to be conformed located at a distance from said fiber support and attached thereto, the direction of said section constituting a longitudinal direction (DL), said optical fiber being made of glass, heating preparation by means of heating means (E1, E2) adapted to melt said glass if said glass remains in a localized heating area (ZC) defined by said heating means, and heating displacement, said operation consisting in a displacement of said fiber support (2) in translation to cause said fiber end (P1) to be conformed to enter said heating area (ZC) and to be removed therefrom after a given period for which said fiber end remains in said area, the duration of said period being limited and such that said fiber end is partially melted so that surface tension and/or gravity forces confer a required shape upon it, this method being characterized in that said heating displacement (MC) is a unidirectional displacement of the fiber support (2) in a sideways passage direction (DP) at an angle to said longitudinal direction (DL), the speed of said displacement being stabilized over a regular displacement period starting before and ending after said period for which said fiber end remains in said heating area.

3. Method according to claim 2 characterized in that said heating displacement (MC) is rectilinear.

4. Method according to claim 2 characterized in that said passage direction (DP) is a transverse direction perpendicular to said longitudinal direction (DL).

5. Method according to claim 2 characterized in that said longitudinal direction (DL) is vertical, said fiber end (P1) to be conformed being below said fiber support (2).

6. Method according to claim 2 characterized in that said fiber fixing operation includes the fixing of a plurality of optical fiber sections (F1, . . . , F6), said sections being identical and after fixing forming a succession of sections in a succession direction (DP) defined by said fiber support, said passage direction (DP) being parallel to said succession direction.

7. Method according to claim 6 characterized in that after said fiber fixing operation and before said heating displacement operation it includes a chemical pre-conformation operation including the following operations:

preparation of a liquid etching bath (4) in an open-top etching container (6), positioning of said fiber support (2) over said etching container, said longitudinal direction (DL) of the fibers being vertical, said fiber ends (P1, . . . , P6) to be conformed being under the fiber support and said succession direction (DP) being horizontal, and dipping of the fibers by vertical displacement (MA) of the fiber support (2) downwards and then upwards to immerse said fiber ends (P1) to be conformed temporarily in said bath so that they assume a pointed intermediate shape after said dipping operation and subsequently, after said heating displacement operation, an optical lens shape constituting said required shape.

8. Method according to claim 6 characterized in that said fiber support (2) is made of monocrystalline silicon and includes a plurality of identical V-grooves (R1, . . . , R6) extending in said longitudinal direction (DL) and regularly spaced in said succession direction (DP) on one side (8) of said fiber support, said side and the flanks of said grooves being formed in preferred crystalographic planes of said fiber support, said fiber fixing operation including the fixing of said plurality of fiber sections (F1, . . . , F6) into said plurality of grooves, one in each, said heating displacement (MC) being rectilinear.

9. Method according to claim 2 characterized in that said heating means comprise electrodes (E1, E2) for creating a stabilized electric arc forming a plasma occupying said heating area (ZC).

* * * * *